United States Patent [19]
van der Lely

[11] Patent Number: 4,955,187
[45] Date of Patent: Sep. 11, 1990

[54] MOWING MACHINE

[76] Inventor: Cornelis van der Lely, 7 Brüschenrain, Zug, Switzerland

[21] Appl. No.: 338,148

[22] Filed: Apr. 14, 1989

Related U.S. Application Data

[62] Division of Ser. No. 18,287, Feb. 24, 1987, Pat. No. 4,827,703.

[30] Foreign Application Priority Data

Feb. 24, 1986 [NL] Netherlands .................. 8600452
May 30, 1986 [NL] Netherlands .................. 8601394

[51] Int. Cl.$^5$ ............................................. A01D 34/66
[52] U.S. Cl. ............................................. 56/13.6; 56/6
[58] Field of Search .................... 56/6, 13.6, 192, 195

[56] References Cited

U.S. PATENT DOCUMENTS

| | | | |
|---|---|---|---|
| 4,577,456 | 3/1986 | van der Lely et al. | 56/13.6 |
| 4,679,384 | 7/1987 | van der Lely et al. | 56/13.6 |
| 4,693,062 | 9/1987 | van der Lely et al. | 56/13.6 |

FOREIGN PATENT DOCUMENTS

| | | |
|---|---|---|
| 0165624 | 12/1985 | European Pat. Off. |
| 0171341 | 2/1986 | European Pat. Off. |
| 2557418 | 7/1985 | France |
| 8202988 | 12/1982 | Netherlands |
| 8403316 | 2/1985 | Netherlands |
| 1563484 | 3/1980 | United Kingdom |
| 2059236 | 4/1981 | United Kingdom |

*Primary Examiner*—Thuy M. Bui
*Attorney, Agent, or Firm*—Penrose Lucas Albright

[57] ABSTRACT

A mowing machine that extends laterally from a tractor and is an assembly of carrier parts, supporting and spacer housings, normally held together by two tensile bars. In the principal embodiment, the first tensile bar is received through the carrier parts at about the same level as the mower's drive shaft where the front of the supporting housing curves to form its bottom. The second tensile bar is similarly situated at the rear of the supporting housing about three or four times farther, however, from the drive shaft. In another embodiment, the first tensile bar is seated in a continuous internal groove and the second tensile bar in a second continuous internal groove, both grooves conforming to the bars' curvature as seen in cross-section. External outwardly facing grooves in another embodiment are defined by supporting and spacer housings. In an embodiment having only one tensile bar, the groove extends from the bottom to the housings' center. For two tensile bars, grooves are formed midway in the housings' upper and lower aspects. For all external grooves, lugs retain tensile bars therein. In one embodiment there are separate forward spacer housings for the drive shaft and a rearmost spacer, a central tensile bar extends through the housings between the forward and rearmost spacers. Carrier parts are urged against each other by tightening a nut on the tensile bar bearing on an outboard crop guide. Stops welded to an inboard transmission gear prevent a nut welded to the tensile bar from turning.

63 Claims, 7 Drawing Sheets

MOWING MACHINE

This is a Divisional Application from Application Serial No. 07/018,287, filed Feb. 24, 1987.

SUMMARY OF THE INVENTION

The invention concerns a mowing machine comprising mowing units having mowing members and at least two partly hollow supporting housings and comprising an at least partly hollow spacer provided between the supporting housings. Said mowing members are connected to the supporting housing so as to be capable of rotation about axes of rotation extending upwardly and said supporting housings and spacers being interconnected by at least one detachable tensile bar which extends through the cavities provided therein.

It is an object of the invention to provide a strong and simple mowing machine of the above-defined type.

In accordance with the invention, this is accomplished when the tensile bar, taken in the normal direction of operative travel of the mowing machine, is located before the axis of rotation of a mowing member. Due to this location of the tensile bar, the forces exerted on the mowing units during operation can be absorbed advantageously thereby. In particular, the mowing machine of the invention is sufficiently robust to absorb forces exerted when it hits an obstacle.

In this connection, the forces exerted on the mowing machine when a mowing unit encounters an obstacle are absorbed in such a manner that the interconnected mowing units continue to be forwardly interconnected.

An advantageous embodiment of a machine according to the invention is obtained when, in accordance with the invention, the supporting housings are interconnected by one tensile bar only.

In accordance with the invention, in a mowing machine comprising mowing units having at least one mowing member and an at least partly hollow supporting housing, said mowing member being connected to the supporting housing so as to be capable of rotation about an upwardly extending axis of rotation and said supporting housings being interconnected by at least one detachable tensile bar, the supporting housings are interconnected by one tensile bar only which, taken in the direction of normal operative travel of the mowing machine, is located before the axis of rotation of the mowing member. In this manner a simple and strong mowing machine is obtained.

According to the invention, in a further embodiment of a mowing machine of the type defined in the opening paragraph, the supporting housings are interconnected by two or more tensile bars extending through the cavity provided therein and the construction is such that the mowing units are interconnected advantageously. In particular, using this construction, it is possible to absorb very strong varying forces without the connection between the mowing units being adversely affected. The machine can be assembled in an improved manner which at the same time, if necessary, the machine can be expeditiously disassembled.

A favorable embodiment is obtained when the tensile bar is located on the level of a drive shaft which extends at least substantially parallel to said tensile bar and is connected to transmission members arranged in the supporting housings for driving the mowing members. Thus, the forces exerted by the tensile bar on the mowing units to be interconnected can be transferred favorably to said mowing units.

The position of the tensile bar in the mowing machine can be situated favorably when the mowing member is provided with at least one mowing knife or other similar cutting member arranged pivotally relative to a mowing member carrier about an axis of rotation which is at least substantially parallel to the axis of rotation of the mowing member, the tensile bar located before the axis of rotation of a mowing member being spaced from this axis of rotation by a distance which is at least approximately equal to one third of the distance between the mowing knife's independence axis of rotation and the mowing member's axis of rotation.

The construction of the mower can be influenced favorable by the spacers. The spacers' construction is adaptable to being kept simple, while by the use, of the spacers mowing units can be reduced to smallest possible size. In this construction, the tensile bar or tensile bars extending through the cavities in the spacers and in the supporting housings can be fitted appropriately in the mowing machine.

When a second tensile bar is provided, this tar can be applied advantageously, in accordance with the invention, when, taken in the direction of normal operative travel of the mowing machine, it is located, seen in plan view, behind the circle described by the axis of rotation of the mowing knife. With this location of the second tensile bar, the forces exerted on the mowing units by the two tensile bars can be beneficially distributed. This is of particular importance when the mowing unit supporting housings, taken in the direction of normal operative travel, are comparatively wide with a view to absorbing greater forces and, more specifically, absorbing varying impact loads which occur during the mowing of uneven fields.

In a further embodiment of the invention a mowing machine comprises a carrier which, during operation, extends transversely to the direction of normal operative travel thereof and is assembled from a plurality of sections which are drawn up against each other by means of at least one tensile member and include supporting housings for mowing members capable of rotation about upwardly extending rotary axes. A tensile member extends over at least part of the carrier's length in a recess formed at the outer side of the carrier's parts which make up the length of the carrier. This renders a simple construction of component parts of the carrier possible, while the tensile member can be easily mounted.

In accordance with a yet further embodiment of the mowing machine of the invention, the tensile member is located at least partly in a recess formed at the outer side of the supporting housing and extending in the longitudinal direction of the carrier. The stiffness of the supporting member is improved in particular in the direction in which a recessed portion extends and in which the forces are exerted on the supporting housings by the tensile member.

In a still further advantageous embodiment, a tensile member is located in a recess formed at the outer side of a spacer arranged between two supporting housings, and which recess extends in the longitudinal direction of the carrier. Thus, also the spacer becomes more rigid as a result of the tensile force exerted thereon by the tensile member. The tensile member located in the recess formed at the outer sides of the relevant parts is shielded such that it cannot be damaged by, for example, obstacles the machine passes by.

A simple embodiment is obtained when the carrier sections are interconnected by two tensile members only. Said tensile members may be located either at the front and rear sides or at the top and bottom sides of the carrier. The use of two tensile bars can be of special importance in the production of mowers having a mowing section of a greater length.

For some types of mowers an advantageous construction is obtained by using only one tensile member for mounting the sections against each other in compression, from which the carrier being assembled substantially from such sections. Then an advantageous position of a tensile member is obtained when it extends approximately in the central region of said carrier. In such structure, the tensile member may be located in a recess formed at the bottom side of the sections constituting the carrier. In accordance with another embodiment, the carrier is located between two adjacent spacers and it further extends through spaces enclosed by supporting housings of mowing units.

Therefore, the invention concerns a mowing machine comprising a carrier which, during operation, extends transversely to the direction of normal operative travel thereof and is assembled from a plurality of sections which are mounted in compression against each other by at least one tensile member and include supporting housings for mowing members which are capable of rotation about upwardly extending rotary axes. Such tensile member extend through the supporting housings and spacers, which are arranged between supporting housings, said spacers, in accordance with the invention, fully separating the consecutive supporting housings and said tensile member extending to outside said spacers. The position of the supporting housings are adequately locked relative to the tensile member. Furthermore, the carrier can be effectively assembled and disassembled.

For a better understanding of the present invention and to show how the same may be carried into effect, reference will now be made, by way of example, to some advantageous embodiments of a mowing machine according to the invention as shown in the accompanying drawings, wherein:

DESCRIPTION OF THE PREFERRED EMBODIMENTS

Figure 1:
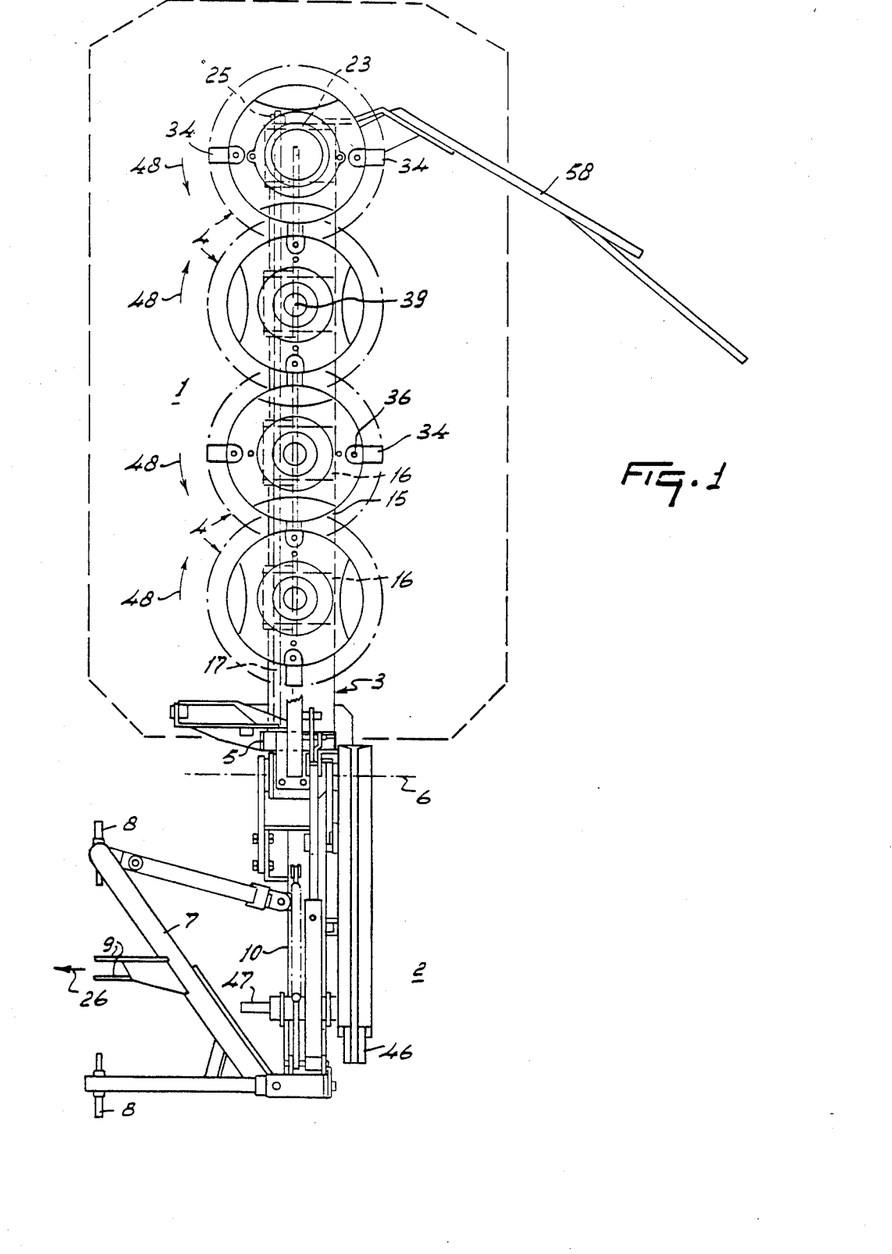
FIG. 1 is a plan view of a first embodiment of a mowing machine according to the invention.
Figure 2:
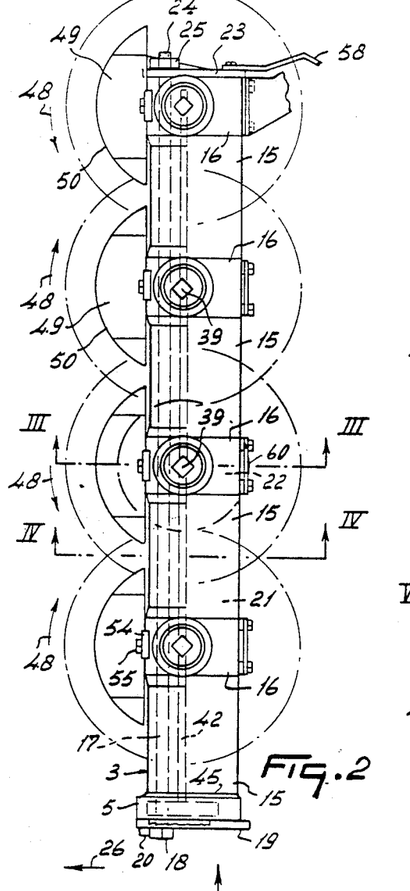
FIG. 2 is, to an enlarged scale, a plan view of part of the mowing machine of FIG. 1.

The mowing machine shown in FIGS. 1 to 5 has, as will be apparent in particular from FIG. 1, a mowing section 1 and a connection frame 2. By means of said connection frame 2 the mowing machine can be coupled to a vehicle, e.g. a tractor, for moving same in particular during operation. The mowing section 1 includes a mowing bar 3 provided in this embodiment with four mowing members 4. However, it is alternatively possible to manufacture a mowing section 1 of a different length. Thus it is possible to fit, for example, a different number of mowing members of similar size as in FIG. 1 to a mowing bar 3 of a different length or mowing members of a different size to a mowing bar of equal or different length. The end of the mowing bar 3 connected to the connection frame 2 has a transmission gear box 5 which is coupled pivotally about pivot axis 6, in a manner not further described, to a carrier arm 10 of the connection frame 2. The connection frame 2 includes a coupling trestle 7 which is connected to the carrier arm 10 and can be coupled to the three-point lifting hitch of a tractor or similar vehicle. To that end, the coupling trestle 7 is provided with two coupling pins 8 which can be coupled to the lifting arms of the lifting hitch of a tractor, and with two coupling strips 9 which can be coupled to the top rod of the three-point lifting hitch of a tractor.

The mowing bar 3 is composed of spacers 15 and mowing units 16. The spacers 15 and the mowing units 16 are arranged alternately and are interconnected by drawing them up against each other by means of one tensile bar 17 only. A final spacer 15 is drawn up against the transmission gear box 5 by means of the tensile bar 17 and is thus linked up therewith. As is apparent from FIGS. 2 and 5, the tensile bar 17 extends through the bottom part of the transmission gear box and has at that side of the transmission gear box 5 opposite the spacer 15 a nut 18 which is rigidly fitted to the tensile bar 17. Against the bottom side of the transmission gear box 5, a supporting plate 19, having a stop 20 cooperating with the nut 18 in such a manner that the tensile bar cannot turn, is provided at the side of said nut 18.

Figure 3:
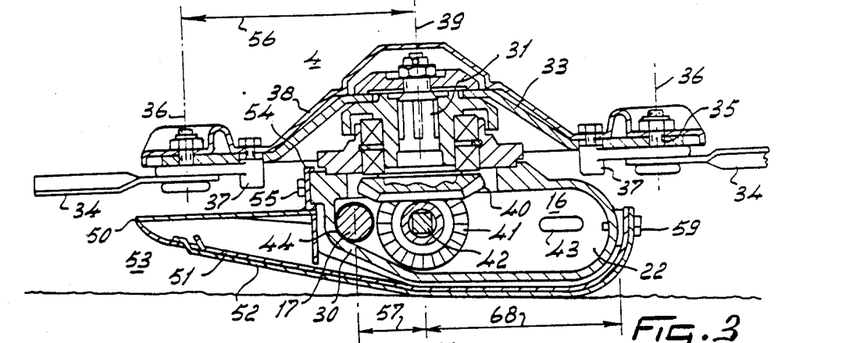
FIG. 3 is a sectional view of the mowing machine, taken on the line III—III in FIG. 2.
Figure 4:
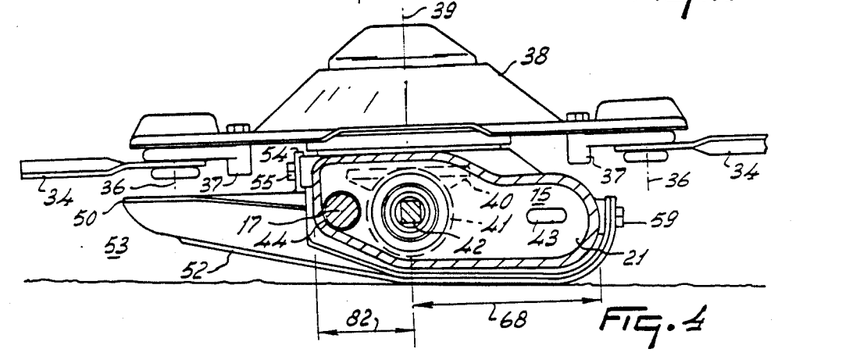
FIG. 4 is a sectional view of the mowing machine, taken on the line IV—IV in FIG. 2.
Figure 5:
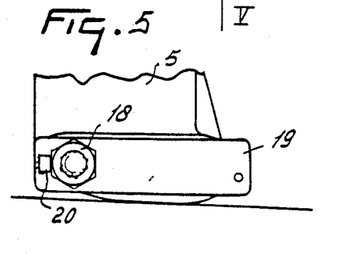
FIG. 5 is a broken elevational view of the mowing machine part of FIG. 2, taken in the direction of the arrow V in FIG. 2.

As is apparent in particular from FIGS. 3 and 4, the spacers 15 and the mowing units 16 are hollow. There, the tensile bar 17 extends through the cavities 21 and 22 in the spacers and in the mowing units, and thus is fully enclosed in the mowing bar 3. The tensile bar 17 extends from the transmission gear box 5 to the other end of the mowing bar 3. The other end includes a mowing unit 16 against which a supporting plate 23 is mounted. The end 24 of the tensile bar is passed through said supporting plate and is provided with a nut 25. The end 24 is screw-threaded to receive the nut 25.

During normal operation of the mowing machine, it travels in the direction 26. With respect to this normal direction of operative travel 26, the tensile bar 17 is arranged in the foremost part of the cavities 21 and 22 in the spacers 15 and mowing units 16, the arrangement being such as is apparent in particular from FIGS. 2 to 4.

The mowing units 16 have a preferably cast iron supporting housing 30 in which a mowing member shaft 31 is bearing-supported, as is apparent in particular from FIG. 3. A mowing member 4 is provided on the shaft 31. The mowing member 4 comprises a carrier or hub member 33, to which mowing elements in the form of mowing knives 34 are fitted diametrically opposite each other relative to the shaft 31. The knives are bolted to the carrier by means of bolts 35, the center line 36 of which constitutes an individual axis of rotation for the mowing knives 34. The mowing knives can travel through substantially 360° about these axes of rotation. The motion about these axes of rotation is limited by a stop 37. The upper end of the mowing member has a covering hood 38 which is formed at least substantially concentrically about the center line 39 of the mowing member shaft 31. The center line 39 of the shaft 31 forms an axis of rotation for the mowing member 4.

The lower side of the shaft 31 carries a bevel gear wheel 40 to cooperate with a bevel gear wheel 41 provided on a drive shaft 42. The bevel gear wheels 40 and 41 constitute transmission members in the supporting housing 30 of the mowing unit 16. The drive shaft 42 extends parallel to the tensile bar 17 through the contiguous mowing units 16 and spacers 15. One end of the shaft 42 is coupled to transmission members present in the gear transmission box 5, which members are not shown in further detail. From the transmission gear box 5 the shaft 42 extends to the end of the mowing bar 3 for driving the mowing members 4 mounted on the mowing bar 3. Relative to the normal direction of operative travel 26, the tensile bar 17 is located before or forward the drive shaft 42. As is apparent in particular from FIGS. 3 and 4, the tensile bar 17 is positioned approximately on the level of the drive shaft 42. In this situation, the tensile bar 17 is located before or forward of the bevel gear wheel 41 and lower than both the upper side of the bevel gear wheel 26 and the gear wheel 40 in its totality. The tensile bar 17 is located approximately below the front side of the bevel gear wheel 41. The contiguous ends of the spacers 15 and the mowing units 16 have end walls. For manufacturing purposes, these end walls are provided with apertures 43, with apertures for receiving the drive shaft 42 and with apertures 44 for receiving the tensile bar 17. The shapes of the contiguous end walls of the spacers and the mowing units are adapted to each other, as is apparent in particular from FIGS. 3 and 4. The lower part of the transmission gear box 5 also has a shape adapted to said shapes and has a connecting end 45 to which a spacer 15 is contiguous. Via transmission members, not further shown, which are arranged in the connection frame 2 and comprise belts 46, the transmission members in the transmission gear box 5 are coupled to a connecting shaft 47. This connecting shaft can be coupled via an intermediate shaft, not shown, to the power take-off shaft of a tractor or a similar vehicle, to which the machine can be connected by means of the connecting trestle 7.

During operation, the implement is moved in the direction 26. The mowing section 1 extends transverse to this direction of operative travel. During operation, the mowing members 4 are caused to rotate from the tractor via the connecting shaft 47 and the further transmission members. The direction of rotation of the mowing members can be selected optionally and, in this embodiment, the mowing members rotate during operation in the direction indicated by the arrows 48. The drive of the mowing members is effected such that the knives 34 cut the crop as freely cutting mowing elements. The mown crop moves to the rear, taken in the direction of operative travel 26, over the mowing members 4.

Because of its location in the front end of the mowing bar 3, the tensile bar 17 adequately absorb the forces exerted on said mowing bar 3. Because the spacers 15 and the mowing units 16 are drawn tightly up against each other in compression by means of the tensile bar 17, they are then interconnected such that forces exerted on the mowing bar 3 during travel of the mowing machine can be absorbed appropriately. Due to the location of the tensile bar 17 near the front side of the mowing bar 3, it will in particular be possible to prevent the possibility of the contiguous planes of the spacers 15 and the mowing units 16 being forced apart. Consequently, the mowing units 16 and the spacers 15, which are only interconnected by the tensile bar 17, during operation, advantageously absorb loads exerted thereupon.

On the mowing units 16 there are mounted segmental protection members 49, which in particular protect the lower sides of the mowing member portions projecting forwardly from the mowing bar 3 against damage ny stationary elements on the soil, such as stones etc. Said protection members 49 are located forward of corresponding supporting housing 30. The front sides of the protection segments are positioned at least approximately centrically about the axis of rotation 39 of the relevant mowing member 4. The mowing members 4 are fitted to the mowing bar 3 such that the axes of rotation 39 of the mowing members, four members in this embodiment, are located in one generally vertically disposed transverse plane. The tensile bar 17 is located forward this plane and hence, taken in the direction of normal operative travel 26, forward of the axes of rotation 39 of the mowing members. The lower side 51 of a protection member 49 extends rearwardly to below the supporting housings 30 and is bolted thereto by means of a bolt 59. Together with the protection member 49, the lower side 51 forms a sliding shoe 53. At its bottom side, the sliding shoe 53 is provided with a wearing plate 52. Each mowing unit 16 is provided with a sliding shoe 53, the mowing machine bearing on the soil via said sliding shoes with at least part of its weight, during operation. The front side of a sliding shoe 53 has a hooked portion 54, which surrounds the front side of the supporting housing 30 and is bolted thereto by means of a bolt 55. The segmental protection portion 49 extends forwardly in such a way that, taken in the direction of operative travel 26, it reaches to near the end of the carrier 33 when said carrier end is in its most forward position. The front side 50 of the portion 49 then extends to near the periphery of the cover plate 38. The segmental protection member 49 extends to below the connection means, constituted by the bolt 35, of the knives 34 to the carrier 33 when the relevant knife 34 extends forwardly.

During operation, the axes of rotation 36 will pass through a cylindrical surface 60, which concentrically surrounds the axis of rotation 39 and is spaced therefrom by a distance 56. Thus, the spacing 56 is less than the distance between the front side 50 of the protection segment 49 and the axis of rotation 39. The tensile bar 17 is spaced from the axis of rotation 39 by a distance 57 (FIG. 3), which is approximately equal to one third of the spacing 56. Said spacing 57 is such that the forces exerted on the mowing bar 3 by the cooperating mowing members are absorbed advantageously by the tensile bar 17. The use of only one tensile bar renders it possible to keep the manufacture and assembly and disassembly of the mower simple. In spite of the use of one tensile bar only, the construction is robust because of the location of the tensile bar in the front part of the mowing bar. Near the end of the mowing bar, the crop mown by the mowing members and discharged over the mowing bar can be guided simply and advantageously by a swath board 58. As is apparent in particular from FIG. 1, the swath board 58 is connected to the supporting plate 23 and to the mowing unit 16 arranged on the free end of the mowing bar 3.

Figure 6:
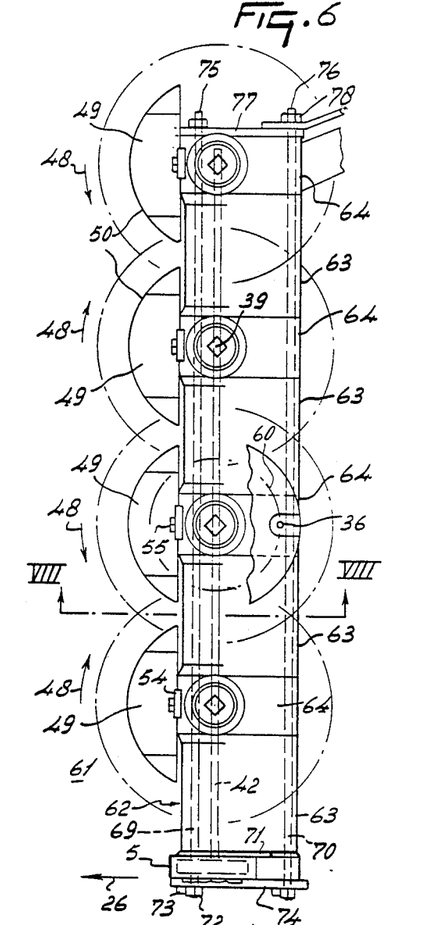
FIG. 6 is a plan view of another embodiment of the mowing machine part of FIG. 2, in accordance with the invention.
Figure 7:
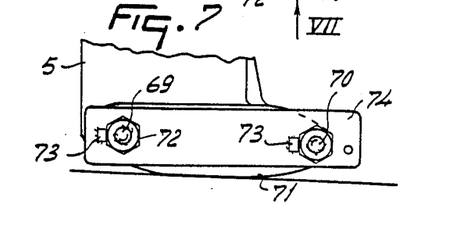
FIG. 7 is a broken elevational view of the mowing machine part shown in FIG. 6, taken in the direction of the arrow VII in FIG. 6.
Figure 8:
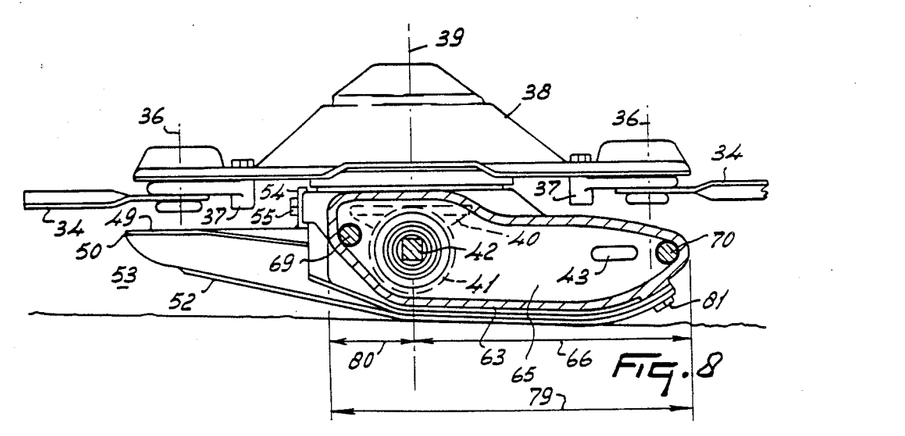
FIG. 8 is a sectional view of the mowing machine of FIG. 6, taken on the line VIII—VIII in FIG. 6.

The embodiment shown in FIGS. 6, 7 and 8 basically corresponds to that shown in FIGS. 1 to 6. In the second embodiment, however, the mowing bar of the mowing unit is of a different construction. In this second embodiment, the mowing unit 61 comprises a mowing bar 62 which, like in the first embodiment, is composed of spacers 63 and mowing units 64. As in the first embodiment, the spacers 63 and the mowing units 64 are preferably made of cast iron, while they comprise cavities, such as the cavity 65 in the spacer 63 as shown in FIG. 8. As in the first embodiment, the mowing units comprise mowing members which are of an identical structure as the mowing members 4 of the first embodiment and for that reason their component parts are referred to by the same reference numerals.

In this embodiment, taken in a direction parallel to the direction of normal operative travel 26, the spacers 63 and the mowing units 64 are wider than in the first embodiment. The front sides of the spacers and mowing units are here positioned relative to the axes of rotation 39 of the mowing members 4 substantially in the same position as in the previous embodiment. In the rearward direction, taken in a direction away from the axes of rotation 39, the spacers 63 and the mowing units 64 extend over a distance 66 exceeding the distance 68, over which the spacers 15 and the mowing units 16 in the first embodiment extend rearwardly from the axes of rotation 39. In this second embodiment, the spacers 63 and the mowing units 64 are intercoupled by, two tensile bars 69 and 70 only. The tensile bar 69 is then in approximately the same position relative to the axes of rotation 39 and the drive shaft 42 as in the first embodiment. The tensile bar 70 is located near the rear side of the spacers 63 and the mowing units 64. Also in this embodiment, the tensile bars 69 and 70 extend through the cavities in the spacers and in the mowing units, so that they are fully contained within the mowing bar 62.

The tensile bars 69 and 70 each have one end located in the lower side of the transmission gear box 5, in the same way as the tensile bar 17 of the preceding embodiment. The tensile bars 69 and 70 extend through the lower side of the transmission gear box 5. At its bottom side, the transmission gear box 5 is provided with a connection portion 71, the shape of which is adapted to the shape of the spacer 63 contiguous thereto. Thus, an adequate connection of the spacer 63 against the bottom side of the transmission gear box 5 is obtained. As in the preceding embodiment, the tensile bars 69 and 70 have nuts 72 which are rigidly connected to the tensile bars and cooperate with stops 73 to prevent the tensile bars from being distorted about their center lines with respect to the transmission gear box 5. The nuts 72 bear against a supporting plate 74 mounted against the bottom side of the transmission gear box 5 at the side remote from the spacer 62.

Those ends of the tensile bars 69 and 70 remote from the transmission gear box 5 cooperate with the supporting plate 77 fitted to the free end of the mowing bar 62. The tension in the tensile bars 69 and 70 can be adjusted to the desired value by means of nuts 78 turned on stub ends 75 and 76 of the tensile bars 69 and 70, and bear against the supporting plate 77. As in the preceding embodiment, a swath member 58 is provided on the supporting plate 77 and the mowing unit connected to the free end of the mowing bar 62.

The mode of operation of the mowing machine of the embodiment shown in FIGS. 6 to 8 is substantially the same as that of the machine of the first embodiment and will therefore not be described any further. The drive of the mowing units also corresponds to that of the mowing members in the first embodiment and is therefore not shown in more detail. Because of the larger width of the spacers and mowing units 64, the mowing bar 62 has a strength which is more appropriate for specific purposes. This construction may, for example, be particularly advantageous when the mowing bar 62 is of a greater length. Because of the larger width 79 of the spacers 63 and of the mowing units 64 and consequently of the mowing bar 62, in particular a longer mowing bar has a greater resistance to the forces acting thereupon during operation. The location of the tensile bars 69 and 70 near the front and rear sides of the mowing bar is then advantageous for absorbing the forces. In this situation, the location of the tensile bars 69 and 70 is advantageous for drawing the spacers 63 and the mowing units 64 up against each other. When two tensile bars are used, each tensile bar, as in this embodiment, may be of a smaller cross-section than when only one tensile bar is used as in the previous embodiment. The spacing 66 between the rear side of the spacers 63 and the mowing units 64 is selected so that the tensile bar 70 provided in its rear side is located behind the cylindrical surface 60 circumscribed by the axes of rotation 36 of the knives 34 during operation. In this embodiment, the tensile bar 70 is indeed located, as will be apparent in particular from FIG. 6, behind the connecting bolts 35 when these bolts are in their rearmost position in relation to the rotation of the mowing members 4.

Although in this embodiment of the FIGS. 6 and 7 only two tensile bars 69 and 70 have been provided, more tensile bars may be present as well. It is, for example, possible to provide a further tensile bar extending through the cavities in the spacers and in mowing units approximately halfway between the tensile bars 69 and 70. This may be desirable when the mowing bar must be of a relatively very great length. Because of the larger widths 79 of the mowing units 64 and the spacers 63, it may be useful to provide an intermediate wall between the upper and lower sides of these mowing units and spacers with the object of reinforcing the relevant components. If so desired, this may also be done in the preceding embodiment.

Taken in the normal operating position of the mowing machine, wherein the mowing members are approximately parallel to the plane to be mown and the axes of rotation 39 are approximately perpendicular to said mowing plane or are at only a slight angle thereto, the tensile bar 70 is approximately at the same level as the drive shaft 42. The tensile bar 69 is also located approximately at the level of this drive shaft. As is shown in the embodiment of FIGS. 1 to 5 for the tensile bar 17, the tensile bar 69 is arranged forward of the bevel gear wheel 41 and below the front side of the bevel gear wheel 40.

The distance 66 is approximately three to four times larger than the distance 80 through which the front side of the spacer 63 extends forward of axes of rotation 39 and the generally vertically disposed transverse plane through said axes of rotation 39, respectively. The front sides of the mowing units 64 are spaced from the axes of rotation 39 by a distance which is only little greater than the distance 80, as is apparent in particular from FIG. 8. As in the embodiment shown in FIGS. 1 to 5, each mowing unit 64 of the embodiment shown in FIGS. 6 to 8 is provided at its bottom with a sliding shoe 53. However, in the embodiment of FIGS. 6, 7 and 8 the sliding shoe 53 is bolted in a slightly different manner to the supporting housing of the relevant mowing unit by means of the bolt 81, as is shown in more detail in FIG. 8. More specifically, the bolt 81 is provided under the tensile bar 70 on upwardly slantingly and rearwardly extending bottom side of the relevant supporting housing.

Although in the embodiments shown the mowing bars 3 and 62 are composed of spacers and mowing units, it is alternatively possible to structure the mowing units such that no separate spacers are required. The mowing bar may then be composed of mowing units which directly link up to each other and, as in the previous embodiments, are mainly urged against each other by one or more tensile bars and are thus interconnected. In addition, it is possible to extend the supporting housing of a mowing unit in both directions by a length equal to half that of the spacers shown. Alternatively, it is possible to extend a mowing unit supporting housing at one side only by a length equal to that of a spacer shown. A mowing bar structure from component parts which are substantially only interconnected by one or more tensile bars is advantageous in that it provides the possibility of making mowing bars of various lengths. In accordance with the invention and the embodiments shown, the position of only one tensile bar, or two or more tensile bars, in the mowing bar can be selected depending upon the mowing bar desired length or the mowing operations to be performed therewith or in consideration of both parameters. The feature of the tensile rod or rods being detachable with respect to the spacers or the mowing units or both, as is apparent from the embodiments shown, is advantageous for assembling, taking apart and/or repairing the mowing machine.

Figure 9:
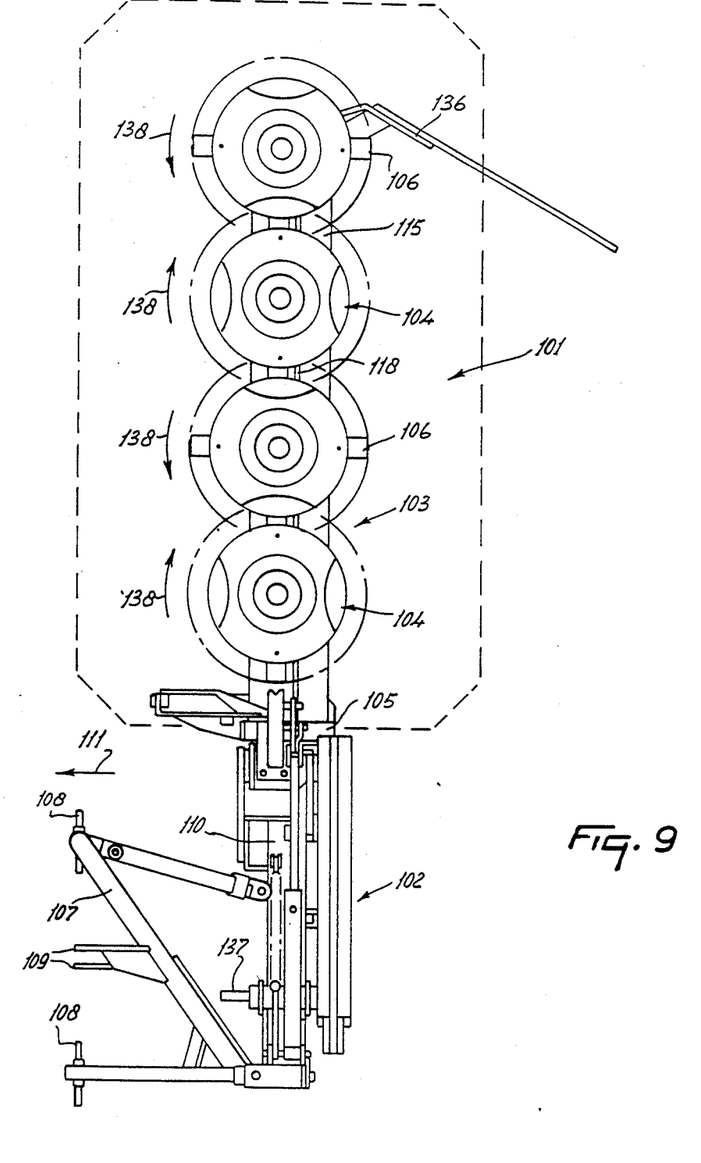
FIG. 9 is a plan view of a further embodiment of a mowing machine according to the invention.
Figure 10:
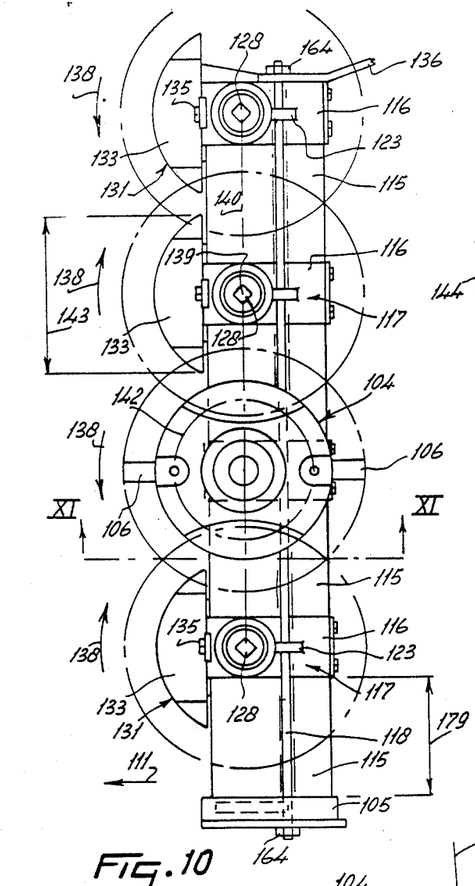
FIG. 10 is, in enlarged scale, a plan view of the mowing section of the mowing machine shown in FIG. 9.

As will be apparent from FIG. 9, the mowing machine shown in the FIGS. 9 to 12 comprises a mowing section 101 and a connection frame 102. The mowing machine can be coupled to a vehicle, e.g. a tractor, by means of the connection frame 102 in order to be moved during operation, in the direction 111. During operation, the mowing section 101 extends transverse to the direction of normal operative travel 111. The mowing section 101 includes a mowing bar 103, to which mowing members 104, in this embodiment four, are mounted. In this situation, the mowing bar 103 constitutes a carrier for the mowing members 104. However, it is alternatively possible to manufacture a mowing section 101 of a different length. For example, a different number of mowing members having the same size as in FIG. 9 can be provided on a mowing bar 103 of different lengths. Also, mowing members of a different size can be provided on a mowing bar having an equal or a different length. That end of the mowing bar 103 connected to the connection frame 102 includes a transmission gear box 105 which, in a manner not further shown, is coupled pivotally about a pivotal axis located parallel to the direction 111 to a carrier arm of said connection frame 102. The said connection frame 102 comprises a coupling trestle 107 which is connected to the carrier arm 110 and can be coupled to the three-point lifting hitch of a tractor or similar vehicle. To that end, the coupling trestle 107 is provided with two coupling pins 108 which can be coupled to the lifting arms of the lifting hitch of the tractor, and with two coupling strips 109 which can be coupled to the top rod of the three-point lifting hitch of a tractor.

The mowing bar 103 is composed substantially of a plurality of parts in the form of spacers 115 and supporting housings 116 for mowing units 117. The spacers 115 and the supporting housings 116 are arranged alternately, said supporting housings being fully spaced apart from each other. The spacers 115 and the supporting housings 116 are arranged alternately, each extending over part of the length of the mowing bar 103. The component parts 115 and 116 are interconnected by two tensile members formed by tensile bars 118 and 119, by means of which the component parts are drawn up against each other and thus are coupled together. The spacers 115 and the mowing units 116 are preferably in the form of cast component parts which, as is shown in particular in FIG. 11 for a spacer 115, enclose a space. The ends of the spacers may be provided with one or more supporting walls which are substantially fully or partly closed. For the sake of stiffness, it is alternatively possible, if so desired, to interconnect the outer walls of the spacers differently, e.g. by means of intermediate walls. As is shown in particular in FIG. 11, the top sides of the spacers 115 and the mowing units 116 are provided with slotted or U-shaped recesses 121. As is apparent in particular from FIG. 10, the said recesses are located in each other's extension and extend parallel to the length of the mowing bar 103. At the bottom sides of the spacers 115 and the supporting housings 116 there are arranged slotted or U-shaped recesses 122. Said recesses 122, in the same manner as recesses 121, are located in each other's extension and extend over the length of the mowing bar 103. As is apparent from FIG.

Figure 11:
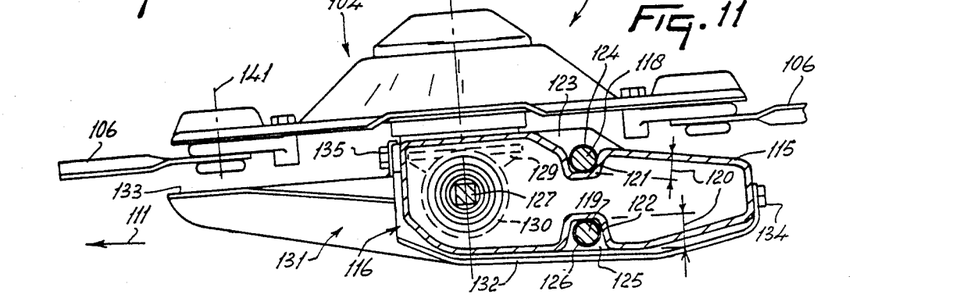
FIG. 11 is a sectional view of the mowing machine, taken on the line XI—XI in FIG. 10.
Figure 12:
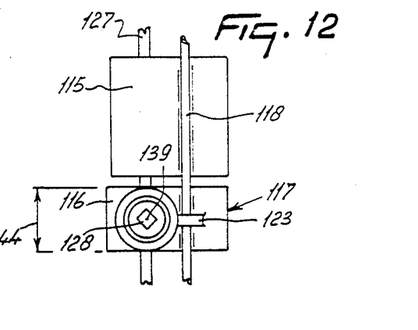
FIG. 12 is a plan view of two sections of the mowing bar, said sections being located at a short distance from each other.

11, the recesses 121 and 122 are formed by inwardly folding the top and bottom wall of the spacers 115 and the supporting housings 116, respectively. The recesses 121 and 122 have a depth 120 which is approximately equal to the cross-section of the tensile members 118 and 119 accommodated therein. The supporting housings 116 have lugs 123 which bridge the recess 121 and have an aperture 124 through which the tensile bar 118 extends. Each supporting housing 116 is provided at its bottom side with a lug 125 which bridges the recess 122 and has an aperture 126 through which the tensile bar 119 extends. The lugs 123 and 125 are provided in the center of the longitudinal portion of the supporting housing 116 which is located in the longitudinal direction of the mowing bar 103.

The supporting housings 116 each enclose a space, at least part of which is closed, wherein an upwardly extending mowing shaft 128 is bearing-supported. The mowing shaft 128 extends to above the top side of the supporting housing 116. In a manner not further shown, a mowing member 104 is mounted on the mowing shaft 128. Each mowing shaft 128 incorporates a gear wheel 129 which co-operates with a gear wheel 130 provided on a drive shaft 127. The drive shaft 127 extends along the entire length of the mowing bar 103 and, by means of one end, links up with the transmission members in the transmission gear box 105, which is not further shown. Those sides of the supporting housings 116 contiguous to the spacers 115, and those sides of the relevant supporting housings facing the ends of the mowing bar 103 have walls terminating the space in the housings 116, in which space the transmission members constituted by the gear wheels 129 and 130 are located. Said walls have a feedthrough aperture for the drive shaft 127, around which sealing means are provided near said feedthrough aperture.

The supporting housing 116 includes a supporting member 131 having a sliding plate 132 arranged under the mowing unit 116 and a protection means 133 located at the front side of the mowing bar 103. At its rear side the mowing shoe is bolted to the supporting housing 116 by means of two bolts 134 and to the front by means of the bolt 135. Together with the mowing shaft 128, the gear wheels 129 and 130, the mowing member 104 and the supporting member 131, the supporting housing 116 forms a mowing unit 117. The supporting housing 116 is preferably manufactured together with the shaft 128 and the gear wheels 129 and 130 as a prefabricated unit. If so desired, it is possible to extend the supporting housing 116 during this prefabrication procedure with the mowing member 104 and the supporting member 131.

During normal operation, the mowing machine is moved in the direction 111. Relative to this direction of normal operative travel 111, the tensile bars 118 and 119 are placed approximately halfway between the front and rear sides of the spacers 115 and the supporting housings 116, as is apparent in particular from FIG. 11. The tensile bars 118 and 119 are arranged at the outer sides of the spaces enclosed by the walls of the spacers and the supporting housings. In this situation, the tensile bars are outside the component parts 115 and 116 which constitute the carrier 103. As is shown in FIG. 11, the bars 118 and 119 are fully enclosed in the recesses 121 and 122. The tensile bar 118 is then located below the plane containing the upper sides of the spacers and the mowing units. The tensile bar 119 is located above the plane containing the bottom sides of the spacers 115 and the mowing units 116. Thus, the tensile bars 118 and 119 are protected in the recesses 121 and 122. Because of the position of the tensile bars 118 and 119 at the outer sides of the component parts 115 and 116, which in substance form the mowing bar 103, the contiguous sides of these units 115 and 116 need .not have separate feedthrough apertures for the tensile bars. Since the tensile bars 118 and 119 are located at the outer sides of the parts 115 and 116, these tensile bars 118 and 119 can be applied easily. Because of the fact that the tensile bars 118 and 119 extend through the respective apertures 124 and 126 of the lugs 123 and 125, a proper positioning of in particular the supporting housings 116 relative to the tensile bars 118 and 119 can easily be accomplished. If desired, the contiguous sides of the component parts 115 and 116 may be of any optional structure. For example, the walls may be provided with mating outwardly and inwardly folded portions, such as projections and recesses. The supporting housings 116 and the spacers 115 are drawn up against each other vigorously by the tensile bars 118 and 119. In this situation, the tensile bars 118 and 119 are anchored in the ends of the mowing bar 103. The tensile bars 118 and 119 are anchored by means of one end to the transmission gear box 105 and by means of the other end to crop guide 136 applied against the mowing bar.

During operation, the implement is moved in the direction 111. The mowing section 101 extends transversely to this direction of travel. During operation, the mowing members 104 are induced to rotate from the tractor via the connecting shaft 127 in the connection frame 102 and other transmission members, not further shown, in the connection frame 102 and the transmission gear box 105. The direction of rotation of the mowing members can be selected optionally, and in this embodiment the mowing members rotate during operation in the direction indicated by the arrows 138. The mowing section is of such a construction that &he mowing knives 106 cut the crop as freely cutting mowing elements. The mown crop moves to the rear wi&h respect to the direction of operative travel 111, over the mowing members 104. The tensile bars 118 and 119 are positioned such that said tensile bars do not constitute an obstacle for the discharge of the mown crop. The lower tensile bar 119 is no obstacle for the desired mode of movement of the mowing bar over the soil. In the region of the supporting housings 116, the tensile bar 119 is protected at its bottom side by the slide plate 132 of the supporting member 131. The protection means 133 of the supporting members 131 substantially protects the front side of the mowing bar 103 and the bottom side of the mowing members 104 provided at the upper side of the mowing bar 103. The protection means 133 of the supporting members have a width 143 exceeding the width 144 of the supporting housings 116, and consequently constitute a protective cover for the contiguous edges of the spacers 115 and of the supporting housings 116 located at the front side of the mowing bar. The front sides of the protection means 133 are arranged at least approximately concentrically around the upwardly extending axes of rotation 139 of the mowing members. Said axes of rotation are constituted by the center lines of the mowing shafts 128 to which the mowing members are rigidly connected during operation. The mowing members are connected to the mowing bar 103 in such a manner that the axes of rotation 139 of the mowing members, four members in this embodiment, are located in a generally vertical deep and transverse plane 140. With respect to the direction 111, the tensile bars 118 and 119 are located behind this plane 140. The plane 140 also contains the center line of the drive shaft 127. The front ends of the protection means 133 extend forwardly to such an extent that they protect the position at the bottom side where the mowing knives 106 are connected to the mowing members 104, in the region where these connections are located during their rotary movement before the front side of the mowing bar 103. Relative to the other portions of the mowing member 104, the mowing knives 106 are rotatable about axes of rotation 141 which, in this embodiment, are parallel to the axes of rotation 139. During rotation of the mowing members, the axes of the knives formed by the axes of rotation 141 circumscribe a cylindrical surface 142 which extends to behind the tensile bars 118 and 119, taken in the direction of normal operative travel 111.

The mowing section 101 may be of a simple structure. The mowing units 117 are made as prefabricated units, on which, if so desired, the mowing members 104 and the supporting members 131 can be mounted during prefabrication. The structure of the mowing unit 101 is easy to implement by mounting the mowing units 117 and the spacers 115 on the drive shaft 127 and the tensile bars 118 and 119, as is shown schematically in FIG. 12, the portions 115 and 116 there still being slightly spaced apart. The component parts 115 and 116 are urged against each other by the tensile bars 118 and 119. The tension in the tensile bars, and hence the force exerted on the component parts 115 and 116, so increases the strength of the mowing bar 103 that a comparatively light construction of the mowing bar adequately absorbs the forces exerted thereupon by the mowing members and by the travel of the mowing section 101 in the direction indicated by the arrow 111. The crop mown and discharged by the mowing members over the mowing bar is advantageously guided by the crop guide 136 at the end of the mowing bar.

Figure 13:
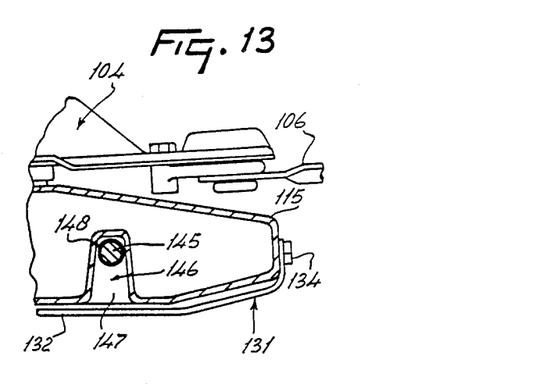
FIG. 13 shows in a broken sectional view another embodiment of a section of the mowing machine according to the invention, FIG. 13 corresponding to FIG. 11.

Although in this embodiment of the FIGS. 9 to 12 the spacers 115 and the supporting housings 116 are urged against each other by two tensile bars, it is alternatively possible to urged the relevant component parts 115 and 116 against each other by means of one tensile bar only or a different number of tensile bars. FIG. 13 shows an implementation using only one tensile member in the form of the tensile bar 145. In all fur&her respects the structure of the mowing section 101 and the mowing bar 103 is identical to that of the previous embodiment, so that this is not shown in further detail, and component parts in FIG. 13 corresponding to the component parts shown in the previous drawings are given the same reference numerals.

In the embodiment of FIG. 13, the top sides of the spacers 115 and of the supporting housings 116 are flat. The bottom sides of the spacers 115 and of the supporting housings 116 are provided with a recess 146 which, from the bottom sides of the relevant component parts 115 and 116, extend to a greater height than the recess 122 of FIG. 11. From the bottom sides of the component parts 115 and 116, the recess 146 extends upwardly to such a height that the tensile bar 145 is located approximately halfway the height of the parts 115 and 116. The tensile bar 145 is positioned high up in the downwardly open recess 146. As the tensile bars 118 and 119 in the previous embodiment, the tensile bar 145 is located outside the component parts 115 and 116 or, put differently, at the outer side of the walls of the parts 115 and 116, considered with respect to the space enclosed by said walls. The supporting housings 116 are provided with lugs 147 which are situated approximately halfway the length of said housings and bridge the recesses 146. Consequently, the walls constituting the recess 146 are reinforced. In addition, the lug 147 has an aperture 148 through which the tensile bar 145 extends. This locks the position of the tensile bar 145 with respect to the supporting housings 116.

Also in this embodiment, the various component parts can rapidly and easily be coupled to each other to form a mowing bar 103 of a desired length, all this as has been described already with respect to the previous embodiment. For that reason the embodiment of FIG. 13 will not be described further regarding this aspect.

The position of the tensile bar through the center (considered in the cross-sectional direction of the mowing bar) advantageously renders the use of only one tensile bar possible. The forces exerted by the tensile bar will then be transferred to the centers of the supporting housings and spacers.

Figures 14, 15, 16:
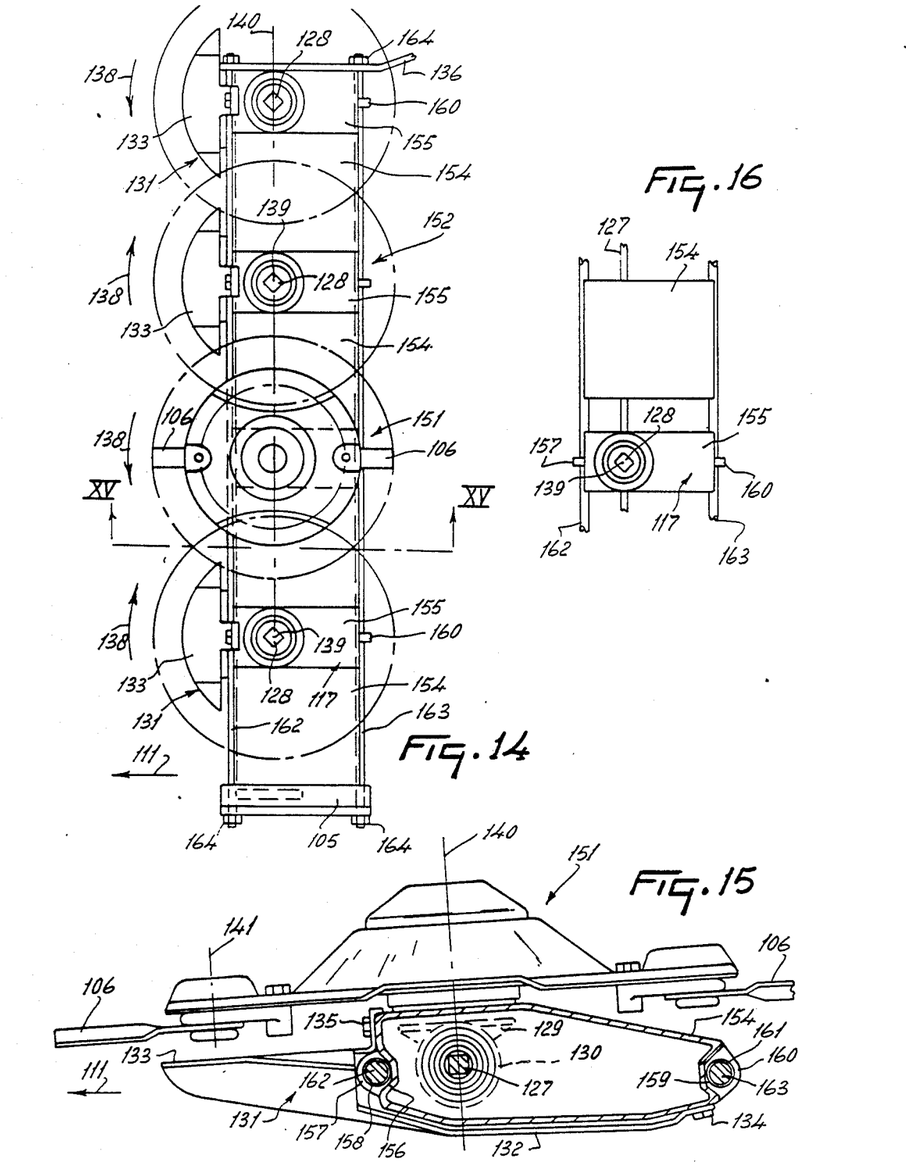
FIG. 14 is a plan view of another embodiment of the mowing section of the machine according to the invention.
FIG. 15 is a sectional view through the mowing section of FIG. 14, taken on the sectional line XV—XV in FIG. 14.
FIG. 16 is a plan view of two sections of the mowing bar of FIG. 14, said sections being spaced from each other.

The FIGS. 14, 15 and 16 show an embodiment that is different from the previous ones. The embodiment of FIGS. 14, 15 and 16 basically corresponds to the embodiment of the FIGS. 9 to 12 , but the mowing bar is of a slightly different structure as compared with that of the embodiment according to FIGS. 9 to 12.

In this embodiment, the mowing machine includes a mowing section 151 which is coupled to a connection frame 102 in the same way as the mowing section 101, which is not shown in further detail. In this situation, the mowing sections 151 has a transmission gear box 105 which is contiguous to the coupling frame, and a crop guide 136.

Also in this embodiment, the mowing bar 152 consists of intercoupled sections, constituted by spacers 154 and supporting housings 155. The supporting housings 155 are part of mowing units which are basically of a similar structure as the mowing units 117, for which reason they are not shown further in their totality. Therefore, in this embodiment corresponding component parts are given the same reference numerals as in the third embodiment. In this embodiment, the spacers 154 and the supporting housings 155 are of a slightly different structure and are interconnected by differently positioned tensile bars. Thus in this embodiment, the spacers 154 and the supporting housings 155 are each provided at their front sides with a recess 156 located approximately halfway the height of the spacers 154 and the supporting housings 155, respectively. Halfway their width, the supporting housings 155 have a lug 157 which bridges recesses 156 and is provided with aperture 158. A tensile bar 162 extending through the apertures 158 of lugs 157 of the supporting housings 155, four housings in this embodiment, is positioned in the recesses 156. As is apparent from FIG. 15, in this embodiment the tensile bar 162 is located approximately on the level of the drive shaft 127. The drive shaft 127 is accommodated halfway the upper and lower sides of the supporting housings and spacers 154. The spacers 154 and the supporting housings 155 have a recess 159 provided at their rear sides. Halfway their width, extending in the longitudinal direction of the mowing bar, the supporting housings 155 each have a lug 160 which bridges the recess 159 and has an aperture 161. A tensile bar 163 extends in the inline recesses 159, which bar further is located through the apertures 161 of the lugs of the supporting housings 155.

Using the construction of this embodiment, the spacers 154 and the supporting housings 155 can also be interconnected advantageously. As in the previous embodiment, the component parts 154 and 155 are urged against each other by the tensile bars 162 and 163, which are anchored in the ends of the mowing bar 152 by nuts 164, by means of which the tension in the tensile bars can be adjusted. The spacers 154 and the supporting housings 155 link up with each other in the same way as shown for the third embodiment.

The mowing machine of the embodiment shown in FIGS. 14, 15 and 16 operates in a similar manner as the mowing machine of the third embodiment. Therefore, component parts corresponding to those in the previous embodiments are given the same reference numerals in FIGS. 14, 15 and 16.

Due to the positions of the tensile bars 162 and 163 at the front and rear sides of the mowing bar, respectively, in particular said front and rear sides can absorb advantageously the forces acting on said mowing bar. The tensile bar 162 is located before the plane 140 containing the axes of rotation 139 of the mowing members 104. The tensile bar 163 is located near the plane containing the rear sides of the surfaces of cylinders circumscribed by the axes of rotation 141 of the mowing members 104, during operation of the mower. As will be apparent in particular from FIG. 15, in this embodiment the tensile bar 163 is located behind this imaginary plane containing and tangent to the rear sides of the cylindrical surfaces 142, in which the axes of rotation 141 move during rotation of the mowing members about the axes of rotation 139. The recess 156 is such that it has a depth approximately equal to half the diameter of the tensile bar 162. Although in this and the previous embodiments the shown tensile bars are of a round cross-section, they may alternatively be of a different structure. For example, it is possible for the tensile bars to have an out-of-round cross-section or to be hollow or both. The tensile bar 162 located at the front side of the mowing bar 152 is shielded along the major portion of its length towards its front side by the protection means 133 of the supporting members 131 connected to the mowing units 117.

Figures 17, 19:
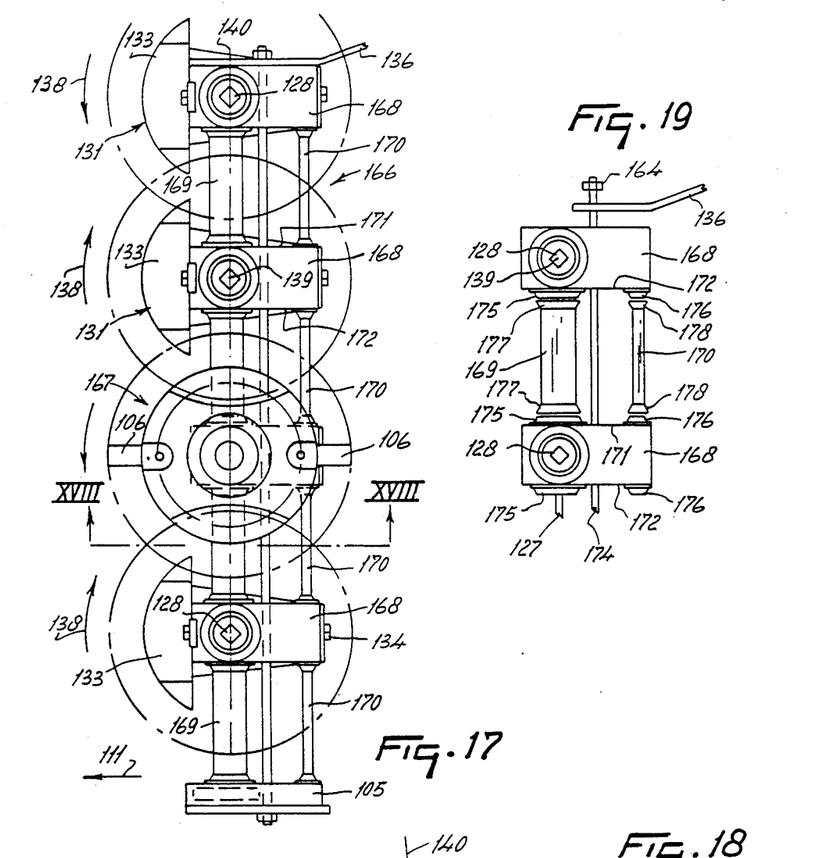
FIG. 17 is a plan view of yet another embodiment of the mowing section of the mowing machine according to the invention.
FIG. 19 shows some sections of the mowing bar as shown in FIGS. 17 and 18 in a plan view, the various sections being spaced at a short distance from each other.
Figure 18:
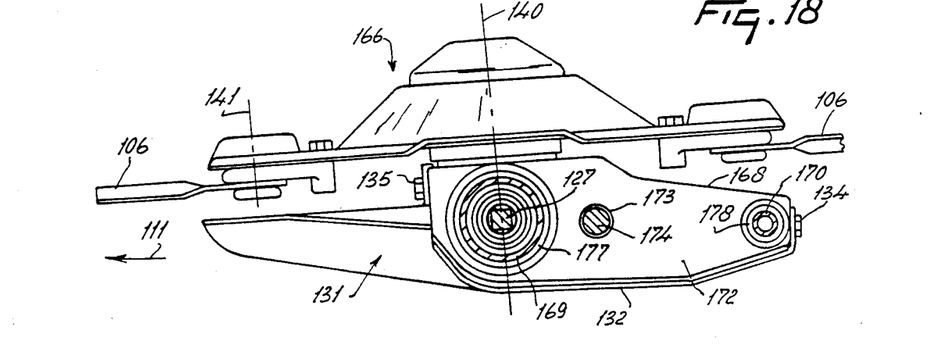
FIG. 18 is a sectional view through the mowing section of FIG. 17, taken on the line XVIII—XVIII in FIG. 17.

FIGS. 17 to 19 show still another embodiment of the mowing unit of a mowing machine according to the invention. In this embodiment, a mowing bar 167 of the mowing section 166 is assembled from supporting housings 168 and spacers 169 and 170. Basically, the mowing units 117 are of a similar structure as the mowing units 117 in the previous embodiment, in which they are provided with mowing members 104 which can be driven by transmission members provided in the mowing unit, from the drive shaft 127 extending in the longitudinal direction of the mowing bar, the arrangement being such as is shown for the third embodiment and, for this reason, not being in any further detail here. Therefore, corresponding components in this embodiment of FIGS. 17 to 19 have the same reference numerals as in the third embodiment.

In this embodiment, two spacers 169 and 170 are arranged between two consecutive supporting housings 168. Said spacers 169 and 170 are of a hollow shape and, in this embodiment, of circular cross-section. The cross-section may alternatively be of a different shape. The spacers 169 and 170 are located near the front and rear sides, respectively, of the mowing bar 167 and extend parallel to each other. In this embodiment, the drive shaft 127 ex&ends approximately through the center of the spacer 169. As is shown in FIG. 19, in this embodiment, the walls 171 and 172 facing other mowing units are provided with projections 175 and 176 which fit in respective mating flanges 177 and 178, of the respective spacers 169 and 170. As a result thereof, when mounting the supporting housings, mowing units and spacers, respectively, such that they are contiguous to each other, they can be applied easily and rapidly in the proper places.

At the sides facing the spacers or the end of the mowing bar, the supporting housings 168 have substantially closed walls 171 and 172, respectively. As in the third embodiment, the supporting housings have a closed portion in which the drive members for the drive of the mowing members are accommodated. The walls 171 and 172 then have feedthrough apertures, sealed by sealing members, for the drive shaft 127. In addition, the walls 171 and 172 have feedthrough apertures 173 for passing through a tensile tar 174. The supporting housings 168 and the spacers 169 and 170 are urged against each other by a tensile bar 174. By means of nuts 169, the tensile bar 174 is anchored, in a similar way as in the preceding embodiment, to the transmission gear box 105 at one end of the mowing bar 167 and to a crop guide 136 mounted at the other end of the mowing bar 167.

The tensile bar 174 extends at least approximately through the center of the supporting housings 168, as is apparent in particular from FIG. 18. The tensile tar 174 is positioned approximately halfway between the front and rear sides of a supporting housing 168 and halfway between the bottom and top sides thereof. The tensile bar 174 is situated approximately on the level of the drive shaft 127. The tensile bar 174 is located between the spacer 169 and the spacer 170. The spacer 170 is then approximately halfway the height of the rear side of a mowing unit 168, as is shown in FIG. 18. The tensile bar 174 extends through the space enclosed by the walls of the supporting housing 168. The space, through which the tensile bar 174 extends in the supporting housing 168, is formed substantially by upper and lower walls and the side walls 171 and 172 of the supporting housing. Said latter space is separated from the space wherein the transmission members for the drive of the mowing members are located. Between the consecutive supporting housings 168, the tensile bar 174 extends parallel to the spacers 169 and 170 and is furthermore parallel to the longitudinal direction of the mowing bar 167. Consequently, the tensile bar 174 is located between the consecutive supporting housings beyond the mowing bar portions formed by the spacers 169 and 170. Although in this embodiment the component parts 169 and 170 are cylindrical, it is alternatively possible for them to have different cross-sections; the spacers 170 may, for example, be solid. In case the drive shaft 127 is to be passed through the spacer 169, the latter must be hollow. The drive shaft 127 is then protected properly.

Using the construction of the embodiment shown in FIGS. 17 to 19, it is also possible to assemble the mowing bar 167 in a fast and appropriate manner from a plurality of mowing units and spacers.

In the embodiments shown, the mowing bar length can be selected in a simple manner by using more or less mowing units and interposed spacers. Thus a mowing unit can easily be manufactured in any desired length having mowing units and spacers of similar shape and construction. If so desired, it is alternatively possible for the spacers to have a greater or shorter length, when larger or smaller mowing members are applied on the mowing units.

Like in the previous embodiments, the mowing bar 167 can be assembled rapidly and easily. The tensile bar 174 then covers part of the length of the mowing bar 167 beyond the parts forming said mowing bar. In this embodiment, the tensile bar 174 is at the outside, that is to say at the outer side of the peripheral sides, of the spacers 169 and 170 which form part of the length of the mowing bar 167.

In the embodiment shown in FIGS. 17 to 19, the supporting housings are spaced from each other, said space being bridged by two spacers 169 and 170. It is equally possible for an embodiment, wherein the tensile member 174 extends through the space in the supporting housing, to have only one spacer applied between two supporting housings. Such a spacer may then, for example, have a shape approximately corresponding to that of the spacer of FIG. 13. In this situation, the tensile member is again located at the outer side of the carrier length portion formed by the spacer.

This last-mentioned embodiment, as well as the embodiment shown in FIGS. 17 to 19, is particularly suitable for use when the width 144 of the supporting housings is of a relatively modest size and is, for example, less than the length 179 of the spacers.

Although in the embodiments disclosed the tensile members are shown as tensile bars, it is alternatively possible to structure same differently, e.g. in the form of hollow sheaths or pipes, or e.g. as flexible members, such as cable-like members.

Although in the embodiments of FIGS. 9 to 16 the recesses are formed by inward foldings of a wall of the relevant portion of the mowing bar, they may alternatively be formed by ridges or similar projections projecting outside said wall. If so desired, said ridges may extend over only part of the length (taken in the longitudinal direction of the mowing bar) of the relevant portions The invention is not limited to the features disclosed in the foregoing with reference to the drawings, but it also encompasses all disclosed features including these not specifically described, but which are shown in the drawings or otherwise apparent therefrom.

Having disclosed my invention, what I claim as new and to be secured by Letters Patent by the U.S. is:

1. A mowing machine comprising a mowing bar, said mowing bar further comprising at least two mowing units, each of said mowing units having a mowing member and a partly hollow supporting housing, at least two partly hollow spacers; one said mowing member being connected to each said supporting housing capable of rotation about an essentially vertical axis of rotation and said supporting housings and said spacers being alternately interconnected by a first and second detachable tensile means, said two tensile means extending through the cavities provided within said supporting housings and spacers.

2. A mowing machine as claimed in claim 1, wherein said second tensile means which extends through cavities in said supporting housings and spacers is located to the rear of said axis of rotation and said first tensile means which extends through cavities is located forward of said axis of rotation.

3. A mowing machine as claimed in claim 2, wherein considered in the direction of normal operative travel of the machine, said second tensile means disposed to the rear of said axis of rotation is about three times farther from said axis of rotation than said first tensile means forward of said axis of rotation.

4. A mowing machine as claimed in claim 3 wherein, considered in the direction of normal operative travel of the mowing machine, said second tensile means is located, as seen in a plan view, behind a circle circumscribed by the axis of rotation of said cutting member around the corresponding mowing member's axis of rotation.

5. A mowing machine as claimed in claim 1, comprising a drive shaft and transmission members supported in said supporting housing for rotating said mowing member, said first tensile means forward of axis of rotation being located approximately on the same level as said drive shaft which extends approximately parallel to said first tensile means, said drive shaft including means for coupling said mowing member to a vehicle's power take-off shaft.

6. A mowing machine as claimed in claim 5, wherein, considered in direction of normal operative travel of the mowing machine, said second tensile means is located behind said axis of rotation.

7. A mowing machine as claimed in claim 1, wherein said transmission members comprise a bevel gear wheel connected to said drive shaft, said first tensile means being in a position lower than the upper side of said bevel gear wheel, a further gear wheel connected to a mowing member shaft which is supported by bearings carried by said supporting housing.

8. A mowing machine as claimed in claim 1, wherein each said mowing member comprises a cutting member which is pivotally arranged in said mowing member to rotate about an axis which is substantially parallel to the aforesaid axes of rotation of said mowing members, said first tensile means which is disposed forward of said axes of rotation of said mowing members being spaced forward of such axes of rotation by a distance which is approximately equal to one-third of the distance between said mowing member's axis of rotation and said cutting member's axis of rotation.

9. A mowing machine as claimed in claim 1, wherein said supporting housings and spacers are composed of cast iron.

10. A mowing machine as claimed in claim 1, wherein said supporting housings and said spacers comprise sides contiguous to each other, said contiguous sides comprising end walls which have apertures therein, said tensile means extending through said apertures.

11. A mowing machine as claimed in claim 1, wherein both said tensile means join an assembly of said housings and said spacers to form a mowing bar, said supporting housings and spacers being connected by both said tensile means to a transmission gear box comprising transmission members coupled to a drive shaft received through said supporting housings and said spacers.

12. A mowing machine as claimed in claim 11, wherein the said transmission gear box is connected to a connecting frame, said frame including coupling means for coupling the mowing machine to a tractor or like vehicle.

13. A mowing machine as claimed in claim 12, wherein said transmission gear box is coupled to said frame by a pivotal shaft which, during operation of the machine, extends at least substantially in the direction of the machine's normal direction of operative travel.

14. A mowing machine as claimed in claim 12, wherein said coupling means comprise a three-point connection by means of which the mowing machine can be coupled to the three-point lifting hitch of a tractor or like vehicle.

15. A mowing machine as claimed in claim 12, wherein said frame comprises further transmission members which are coupled to said transmission members mounted in said transmission gear box and which include a stub axle which can be coupled to a power take-off shaft of a tractor or like vehicle.

16. A mowing machine as claimed in claim 1, wherein at its end remote from said gear transmission box said mowing bar is provided with a supporting plate in which both said tensile means are received, a tensioning member connected to each said tensile means near said supporting plate, each said tensioning member adapted to tighten one of said tensile means for interconnecting said supporting housings and said spacers.

17. A mowing machine as claimed in claim 16, wherein said supporting plate comprises a swath member.

18. A mowing machine as claimed in claim 1, comprising a horizontally disposed drive shaft for rotating said mowing machine wherein said second tensile means is located approximately at the same level as said drive shaft.

19. A mowing machine as claimed in claim 1, wherein each said mowing members each further comprises a cutting knife which is rotatable about an axis essentially vertical relative to the remainder of each said mowing member.

20. A mowing machine as claimed in claim 1, wherein one said spacer, considered in a direction transverse to the longitudinal direction in which said mowing bar extends, has a cross-section which is approximately identical to a cross-section of one of said supporting housings, the walls of said supporting housings and of said spacers being substantially entirely contiguous to each other.

21. A mowing machine as claimed in claim 1, wherein said first tensile means and said second tensile means are supported in the facing opposite interior ends of said mowing bar.

22. A mowing machine comprising: a mowing bar, said mowing bar further comprising at least two mowing units, each of said mowing units having a mowing member and a partly hollow supporting housing, at least two partly hollow spacers; one said mowing member being connected to each said supporting housing capable of rotation about an essentially vertical axis of rotation and said supporting housings and spacers being alternatively interconnected by at least one detachable tensile means, said tensile means extending for at least a portion of said mowing bar's length in a continuous recess formed in the outer sides of said mowing bar's parts that define said mowing bar's length.

23. A mowing machine as claimed in claim 22, wherein said continuous recess is formed on the lower sides of said supporting housings and spacers.

24. A mowing machine as claimed in claim 22, further comprising a second continuous recess formed on a side of said supporting housings and said spacers opposite said first continuous recess mentioned.

25. A mowing machine as claimed in claim 22, comprising a further continuous recess formed in the outer sides of said supporting housings and said spacers and a further tensile means received in said further continuous recess, said further continuous recess being formed in the opposite side of said supporting housings and spacers from said first mentioned continuous recess.

26. A mowing machine as claimed in claim 25, wherein said first mentioned continuous recess is formed in the outer sides of the lower aspects of said supporting housings and spacers and said further continuous recess is formed in the upper aspects of the outer sides of said supporting housings and spacers.

27. A mowing machine as claimed in claim 25, wherein said first mentioned continuous recess is formed in the forward aspects of said outer sides of said supporting housings and spacers and said second continuous recess is formed in the rear aspects of the outer sides of said supporting housings and spacers.

28. A mowing machine as claimed in claim 25, wherein said mowing bar parts are interconnected by only two tensile means.

29. A mowing machine as claimed in claim 22, wherein said continuous recess is formed in the outer sides of the forward aspects of said supporting housings and spacers.

30. A mowing machine as claimed in claim 22, wherein a second continuous recess is formed in the outer sides of the rear aspects of said supporting housings and spacers.

31. A mowing machine as claimed in claim 22, wherein said mowing bar parts are inter-coupled by only one tensile means which extends at least substantially through the center of said mowing bar, said continuous recess extending substantially into said mowing bar center where it receives said tensile means.

32. A mowing machine as claimed in claim 31, wherein said continuous recess is substantially opened downwardly.

33. A mowing machine as claimed in claim 22, further comprising a lug attached to at least one said mowing bar part, said lug mounted transverse to the direction in which said continuous recess extends as formed in said mowing bar parts and having an aperture through which said tensile means extends.

34. A mowing machine as claimed in claim 33, wherein said at least one mowing bar part to which said lug is attached comprises a said supporting housing.

35. A mowing machine as claimed in claim 34, wherein said recess extends from the bottom of said mowing bar part in which the recess is defined, over a height which is more than approximately twice the cross-section height of said tensile means seated therein.

36. A mowing machine as claimed in claim 22, wherein said continuous recess has a depth which is approximately equal to the cross-section height of said tensile means seated therein.

37. A mowing machine as claimed in claim 22, wherein said supporting housings comprise a supporting member which extends over at least part of the open side of said continuous recess which is defined by the lower side of each said supporting housing and spacer.

38. A mowing machine as claimed in claim 22, wherein at least one of said tensile means is positioned near the front side of said mowing bar at least at the level of said supporting housings behind a protection means provided on said supporting housings.

39. A mowing machine as claimed in claim 38, wherein said protection means is part of a supporting member which is provided on each supporting housing, each said supporting housing having transmission members provided therein for driving a said mowing member during operation, each said supporting housing, its corresponding said supporting member, said transmission member, and mowing member constituting a mowing unit.

40. A mowing machine as claimed in claim 22, wherein, with respect to the direction of normal operative travel of the mower during operation, said second tensile means is positioned behind a center plane that contains the axes of rotation of said mowing members.

41. A mowing machine as claimed in claim 22, wherein each said spacer is hollow.

42. A mowing machine comprising: a mowing bar, said mowing bar further comprising at least two mowing units, each of said mowing units having a mowing member and a partly hollow supporting housing; at least two partly hollow spacers; one said mowing member being connected to each said supporting housing capable of rotation about an essentially vertical axis of rotation and said supporting housings and spacers being alternately interconnected by at least one detachable tensile means, said tensile means extending through the inner side of each said supporting housing and at the outer side of at least one said spacer which is interposed between two spaced-apart said supporting housings, said spacer forming part of said mowing bar's length.

43. A mowing machine as claimed in claim 42, wherein a portion of said tensile means which is located outside a spacer is parallel to one of said spacers, said one spacer having a considerably smaller cross-section than the cross-section of at least one said supporting housing.

44. A mowing machine as claimed in claim 43, wherein said tensile means is provided between two said spacers, which are spaced apart and one said supporting housing is provided between them.

45. A mowing machine as claimed in claim 42, wherein said tensile means extends between a spacer provided near the forward side of said mowing bar and a further spacer provided near the rear side of said mowing bar.

46. A mowing machine as claimed in claim 45, which comprises knives for cutting crop and rotatable mowing members to which said knives are secured to be turnable about securing axes, wherein said spacer provided near the rear side of said further mowing bar is positioned near a plane containing the rear parts of paths through which said securing axes pass during rotation of said mowing members during the mowing machines operation.

47. A mowing machine as claimed in claim 42, wherein the adjacent ends of said supporting housings and said spacers are respectively provided with projections and mating openings in which said projections at least substantially fit.

48. A mowing machine, comprising:
a mowing bar, said mowing bar further comprising a mowing unit having a mowing member and a supporting housing, said mowing member being connected to said supporting housing so as to be capable of rotation about an upwardly-extending axis of rotation;
at least one spacer having a side adjacent and contiguous to a side of said supporting housing, said contiguous sides of said supporting housing and said spacer including end walls, the shapes of said end walls being adapted to receive each other, said ends walls being provided with apertures; at least two tensile means being received through said apertures for tightly compressing said supporting housing and said spacer against each other.

49. A machine as claimed in claim 48, wherein a segmental protection member is mounted to the front side of said supporting housing, the front side of said protection member being positioned at least approximately centrally relative to said axis of rotation, said protection member overlapping with its rear side the front ends of said end walls of said contiguous sides of supporting housing and said spacer, the lower side of said protection member extending rearwardly to below said supporting housing and being bolted at the rear side of said supporting housing and the rear side of said protecting member being bolted to the front side of said supporting housing.

50. A mowing machine as claimed in claim 48, wherein said mowing member comprises two cutting members which are disposed so that one is opposite to the other and at an equal distance from said axis of rotation, said cutting members being pivotally arranged in said mowing member to rotate about axes which are substantially parallel to said axis of rotation of said mowing member, one of said tensile means disposed forward of said axis of rotation of said mowing member by a distance which is approximately equal to one-third of the distance between the foremost point of a path described by said cutting members' axes of rotation and said mowing member's axis of rotation, said second tensile member disposed rearward of said mowing member's axis of rotation.

51. A machine as claimed in claim 48, wherein said mowing bar is connected to a transmission gear box comprising transmission members, said transmission members being coupled to a drive shaft received in said mowing bar and extending through said supporting housing and said spacer, said transmission gear box being connected to a connecting frame including coupling means for coupling the machine to a tractor or like vehicle, said mowing bar being connected to said transmission gear box with a final spacer having an end wall adapted to the contiguous lower side of said transmission gear box, the front ends of the contiguous said end wall of said final spacer and said lower side of said transmission gear box being situated forward of the said one of said tensile means considered in the usual direction of operative travel of the machine.

52. A mowing machine comprising:
a mowing bar, said mowing bar further comprising at least two mowing units, each said mowing unit including a mowing member, each said mowing member being mounted on a shaft rotatably supported in a hollow supporting housing of each said mowing unit;
at least two spacers, one of said spacers being disposed between said supporting housing, one end of the said mowing bar being connected to a transmission gear box with the other of said spacers, said transmission gear box comprising transmission members coupled to a drive shaft received in said mowing bar and extending through said supporting housings and said spacers, said transmission gear box being connected to a connecting frame including coupling means for coupling the machine to a tractor or like vehicle, said supporting housings and said one spacer having end walls adapted to receive each other, an end wall of said other spacer and lower end wall of said transmission gear box also being adapted to receive each other, the contiguous said end walls of said supporting housings and said one spacer and said other spacer with said end wall of said transmission gear box being tightly compressed against each other by at least two tensile means;

said at least two tensile means extending through the lower part of said transmission gear box, said supporting housing and said spacers to compress said transmission gear box, said supporting housings and said spacers against each other, one of said tensile means being disposed forwardly of said shafts of the mowing members considered in the usual direction of operative travel of the machine and a further one of said tensile means being disposed to the rear thereof.

53. A mowing machine comprising a mowing bar, said mowing bar comprising a number of hollow units pressed against each other by at least two tensile means, whereby at least one hollow unit supports a mowing member capable of rotation about an upwardly extending axis of rotation and a second hollow unit forms a spacer between units supporting a mowing member, said spacer unit being arranged at a side of said one hollow unit supporting a mowing member, the contiguous ends of the said hollow units having shapes so as to be adapted to each other, said hollow units being pressed against each other by said at least two tensile means, the circumference of each said tensile means over its whole length of the respective tensile means at least partly surrounded by said hollow units.

54. A mowing machine as claimed in claim 53, wherein said contiguous ends of said hollow units have walls shaped to adapt to one other, said walls being provided with apertures through which extend said at least two tensile means whereby said tensile means are entirely surrounded by said units between their opposite ends.

55. A mowing machine as claimed in claim 53, wherein said hollow units are provided with recesses extending over the length of said hollow units parallel to the length of said mowing bar, each said tensile means seen in its cross-section having at least part of its circumference surrounded by and in contact with the walls of said recesses.

56. A mowing machine as claimed in claim 55, wherein lug means are provided which bridge said recesses and which have apertures through which said tensile means extend.

57. A mowing machine as claimed in claim 56, wherein said lug means are provided about in the middle of the length of said one hollow unit supporting a mowing member.

58. A mowing machine comprising a mowing bar, said mowing bar further comprising a mowing unit comprised of a mowing member and a supporting housing, said mowing member being connected to said supporting housing so as to be capable of rotation about an upwardly extending axis of rotation, hollow spacers being arranged adjacent opposite sides of said supporting housing, said spacers not being provided with mowing members, the contiguous ends of said supporting housing and said spacers having end walls with shapes which are adapted to each other, said end walls being provided with apertures for receiving at least two tensile means for drawing said supporting housing and said spacers, tightly against each other in compression, one of said tensile means being arranged near the front side of said housing and spacers and the second said tensile means being arranged near the rear side of said housing and spacers, both said tensile means being substantially entirely enclosed by parts of said supporting housing and spacers between their opposite ends.

59. A mowing machine comprising a mowing bar, said mowing bar comprising at least one mowing unit having mowing member and a supporting housing, said mowing member being connected to said supporting housing so as to be capable of rotation about an upwardly extending axis of rotation, spacers being arranged adjacent opposite ends of each said supporting housing, the contiguous ends of said supporting housings and said spacers having end walls which are configured to be adapted to each other, opposite sides of said supporting housings and spacers being provided with recesses for receiving at least two tensile members which are at least partly confined by the walls of said recesses over substantially the entire lengths of said tensile means, said two tensile means drawing said supporting housings and said spacers firmly against each other so they are held together in a state of compression, said supporting housings being provided with retaining means for retaining said tensile means in their desired positions relative to said supporting housings and said spacers.

60. A mowing machine as claimed in claim 59, wherein said recesses are provided at the front and rear sides of said supporting housings and spacers in relation to the normal direction of operative travel of the mowing machine, said recesses have a depth which is approximately equal to half the overall width of the cross-section of said tensile means.

61. A mowing machine as claimed in claim 59, wherein said recesses are provided at the upper and lower sides of said supporting housings and spacers whereby said recesses have a depth which is larger than the overall width of the cross-section of said tensile means.

62. A mowing machine comprising a mowing bar, said mowing bar comprising at least one mowing unit having a mowing member and a supporting housing, said mowing member being connected to said supporting housing so as to be capable of rotation about an upwardly extending axis of rotation, spacers being arranged adjacent opposite ends of each said supporting housing, said supporting housing having end walls provided with apertures for receiving at least one tensile means for drawing said supporting housing and said spacers firmly together so that they are in a state of compression, said tensile means extending through supporting housings, said tensile means extending between two supporting housings which are separated from each other by at least two of said spacers which are disposed generally parallel to and forward and aft of said tensile means so that disposed between said two supporting housings are said at least two spacers which are maintained in a state of compression by said tensile means.

63. A mowing machine as claimed in claim 62, wherein the adjacent ends of said spacers and said supporting are provided with projections and mating nozzles.

* * * * *